United States Patent
Maeda

(10) Patent No.: US 9,227,251 B2
(45) Date of Patent: Jan. 5, 2016

(54) HOLE DRILLING METHOD AND MACHINE TOOL

(71) Applicant: MAKINO MILLING MACHINE CO., LTD, Tokyo (JP)

(72) Inventor: Junichi Maeda, Aiko-gun (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 358 days.

(21) Appl. No.: 14/018,151

(22) Filed: Sep. 4, 2013

(65) Prior Publication Data

US 2014/0064866 A1     Mar. 6, 2014

(30) Foreign Application Priority Data

Sep. 6, 2012   (JP) ................... 2012-196083

(51) Int. Cl.
  *B23C 3/04*   (2006.01)
  *B23B 35/00*   (2006.01)
  *B23B 41/02*   (2006.01)
  *B23B 39/00*   (2006.01)
  *B23B 1/00*   (2006.01)

(52) U.S. Cl.
  CPC .............. *B23B 35/00* (2013.01); *B23B 39/006* (2013.01); *B23B 41/02* (2013.01); *B23B 1/00* (2013.01); *B23C 3/04* (2013.01); *Y10T 408/03* (2015.01); *Y10T 408/42* (2015.01)

(58) Field of Classification Search
  CPC .. B23C 3/04; B23C 2220/48; B23C 2220/52; B23B 1/00; B23B 35/00; B23B 39/12; B23B 41/02; B23B 2220/52; B23B 2270/54; B23B 3/22; B23B 3/24; B23B 3/26; B23Q 5/34
  USPC ............ 409/131–132, 199–200; 408/1 R, 71, 408/55, 88, 236–237; 82/1.11
  See application file for complete search history.

(56) References Cited

U.S. PATENT DOCUMENTS

| | | | | |
|---|---|---|---|---|
| 2,383,201 A | * | 8/1945 | Kruchten | B23B 49/00 269/146 |
| 2,471,940 A | * | 5/1949 | Exsior | B23Q 1/4814 408/103 |
| 2,670,545 A | * | 3/1954 | Kaminski | B23Q 16/001 142/1 |
| 3,386,146 A | * | 6/1968 | Deflandre | B23B 39/02 29/26 R |
| 4,573,840 A | * | 3/1986 | Skrentner | B23C 3/02 409/171 |
| 5,197,836 A | * | 3/1993 | Crivellin | B23Q 1/5481 409/200 |
| 5,396,821 A | * | 3/1995 | Okumura | B23B 1/00 700/160 |
| 5,580,198 A | * | 12/1996 | Saeki | B23P 13/02 409/166 |
| 6,719,502 B2 | * | 4/2004 | Sieradzki | B23Q 1/012 408/1 R |
| 7,137,940 B2 | * | 11/2006 | Taniguchi | B23Q 1/4852 408/71 |
| 2013/0156523 A1 | * | 6/2013 | Yamaguchi | B23C 3/32 409/132 |

FOREIGN PATENT DOCUMENTS

JP     61-4608     1/1986
JP     2012-96354     5/2012

* cited by examiner

*Primary Examiner* — Daniel Howell
(74) *Attorney, Agent, or Firm* — Morrison & Foerster LLP

(57) ABSTRACT

A hole drilling method includes a rotating step of attaching a workpiece to a rotary table to make the workpiece rotate in an opposite direction to the rotating direction of the rotary tool and a drilling step of making the rotary tool and the workpiece move relative to each other in a direction in which they approach each other so as to drill a hole. The hole drilling step comprises making a position of the rotary tool track the rotation of the workpiece while drilling the hole so that the rotary tool is arranged at a position for drilling a hole in the workpiece.

6 Claims, 6 Drawing Sheets

HOLE DRILLING METHOD AND MACHINE TOOL

This application is based on Japanese Patent Application No. 2012-196083 filed Sep. 6, 2012, the content of which is hereby incorporated by reference.

BACKGROUND OF THE INVENTION

1. Field of the Invention

The present invention relates to a hole drilling method and a machine tool.

2. Description of the Related Art

In the prior art, a machine tool which rotates a drill or other rotary tool to drill a hole in a workpiece is known. When drilling a hole in a workpiece, it is possible to rotate the drill or other rotary tool about its axis while moving the rotary tool toward the workpiece so as to form the desired hole. In such hole drilling, it is preferable to drill a hole of a desired shape at a desired position. That is, the machining accuracy of the hole is preferably high.

In this regard, when drilling a hole, the dimensional accuracy sometimes falls at the inside of the hole or the machining accuracy of the hole otherwise deteriorates. In particular, for drilling a deep hole where the depth is greater than the diameter of the hole, it is necessary to use a drill with a small diameter and a long axial direction. For this reason, sometimes the drill becomes lower in rigidity and the hole becomes lower in machining accuracy.

Japanese Patent Publication No. 61-4608A discloses a numerically controlled lathe which uses a drill mounted on a mill shaft to drill a hole in a workpiece which is secured by a chuck. In this lathe, when a flag which instructs drilling of a deep, small diameter hole is stored in the memory region, the workpiece and the drill are made to rotate in opposite directions. That is, it is disclosed to rotate the workpiece and rotate the drill and to make the drill rotate in the opposite direction to the rotating direction of the workpiece.

When drilling a hole, the drill etc. is rotated while gradually inserting it into the workpiece. The machining accuracy of the hole includes the dimensional accuracy of the change in shape of the hole in the depth direction and the straightness accuracy of the hole (or bending accuracy of the hole). In drilling a hole, it is preferable to drill it while suppressing deterioration of the machining accuracy.

As disclosed in the above Japanese Patent Publication No. 61-4608A, it is possible to improve the machining accuracy by making the workpiece and drill rotate in opposite directions to each other on the same axis while making them approach. In particular, in the drilling of a deep hole, it is possible to drill a hole by a high machining accuracy.

In this regard, in this drilling, it is necessary to make the workpiece rotate so that the depth direction of the hole is aligned with the axis of rotation of the workpiece. It is necessary to arrange the position of drilling the hole on the axis of rotation of the workpiece. For this reason, when drilling a plurality of holes in a single workpiece, it is necessary to change the position of the workpiece each time drilling a hole. That is, when drilling a plurality of holes, it is necessary to refasten the workpiece to the workpiece rotating device so that the position of the hole is aligned with the axis of rotation of the workpiece. There is therefore the problem that the work takes time and trouble.

Further, since fastening the workpiece so that the position of the hole is aligned with the axis of rotation of the workpiece, sometimes unbalance occurs when making the workpiece rotate or the end of the workpiece strikes the machine tool making machining impossible. For example, when drilling a hole at one end of a long, thin workpiece, it is necessary to arrange that end on the center axis of the workpiece rotating device. In this case, sometimes the other end at the opposite side to that one end sticks out from the rotating device. As a result, when rotating the workpiece, sometimes the distance between the center of gravity position of the workpiece and the axis of rotation ends up becoming large and unbalance is caused. Alternatively, sometimes the other end strikes the machine tool. As a result, there is the problem that the workpiece which can be drilled with a hole becomes smaller.

SUMMARY OF THE INVENTION

The hole drilling method of the present invention is a hole drilling method which makes a rotary tool rotate while making the rotary tool and a workpiece move relative to each other so as to drill a hole, which includes a rotating step of attaching the workpiece to a workpiece rotating device to make the workpiece rotate in an opposite direction to a rotating direction of the rotary tool and a hole drilling step of making the rotary tool and the workpiece move relative to each other in a direction in which they approach each other so as to drill a hole. To arrange the rotary tool at a position for drilling a hole in a workpiece, the position of the rotary tool is made to track the rotation of the workpiece while drilling the hole.

In the above invention, the hole drilling step can comprises using two or more linear feed axes to change the relative position of the rotary tool with respect to the workpiece.

In the above invention, the hole drilling step can comprises drilling a deep hole with a ratio of depth to diameter of the hole of 7 or more.

The machine tool of the present invention is a machine tool which rotates a rotary tool while making the rotary tool and a workpiece move relative to each other to drill a hole, provided with a workpiece rotating device which makes the workpiece rotate about an axis of rotation parallel to an axis by which the rotary tool rotates, a movement device which changes the relative position of the rotary tool and the workpiece, and a control device which controls the movement device. The control device controls the rotating direction of the rotary tool and the rotating direction of the workpiece to become opposite and controls the movement device so as to drill the hole while making the position of the rotary tool track rotation of the workpiece so that the rotary tool is arranged at a position for drilling the hole of the workpiece.

In the above invention, the movement device can use two or more linear feed axes to change the relative position of the rotary tool with respect to the workpiece.

In the above invention, a spindle is provided for supporting the rotary tool, the rotary tool includes a drill which is formed in a rod shape, and the drill is made one with a ratio of the length to the diameter of the part sticking out from the spindle of 7 or more.

DESCRIPTION OF PREFERRED EMBODIMENTS

Referring to FIG. 1 to FIG. 8, a drilling method and machine tool in an embodiment will be explained. In the present embodiment, a numerical control type machine tool is shown as an illustration.

Figure 1:
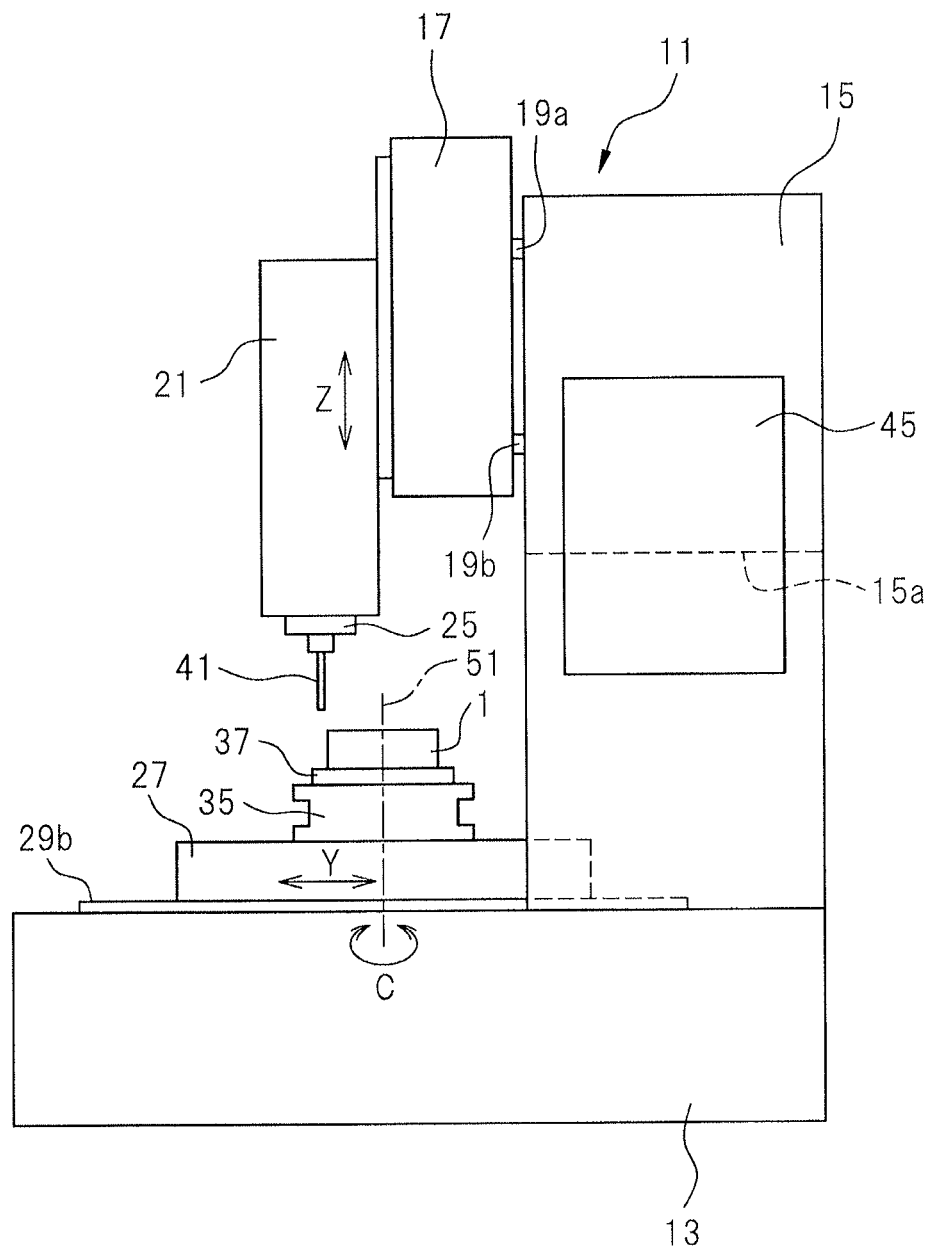
FIG. 1 is a schematic side view of a machine tool in an embodiment.
Figure 2:
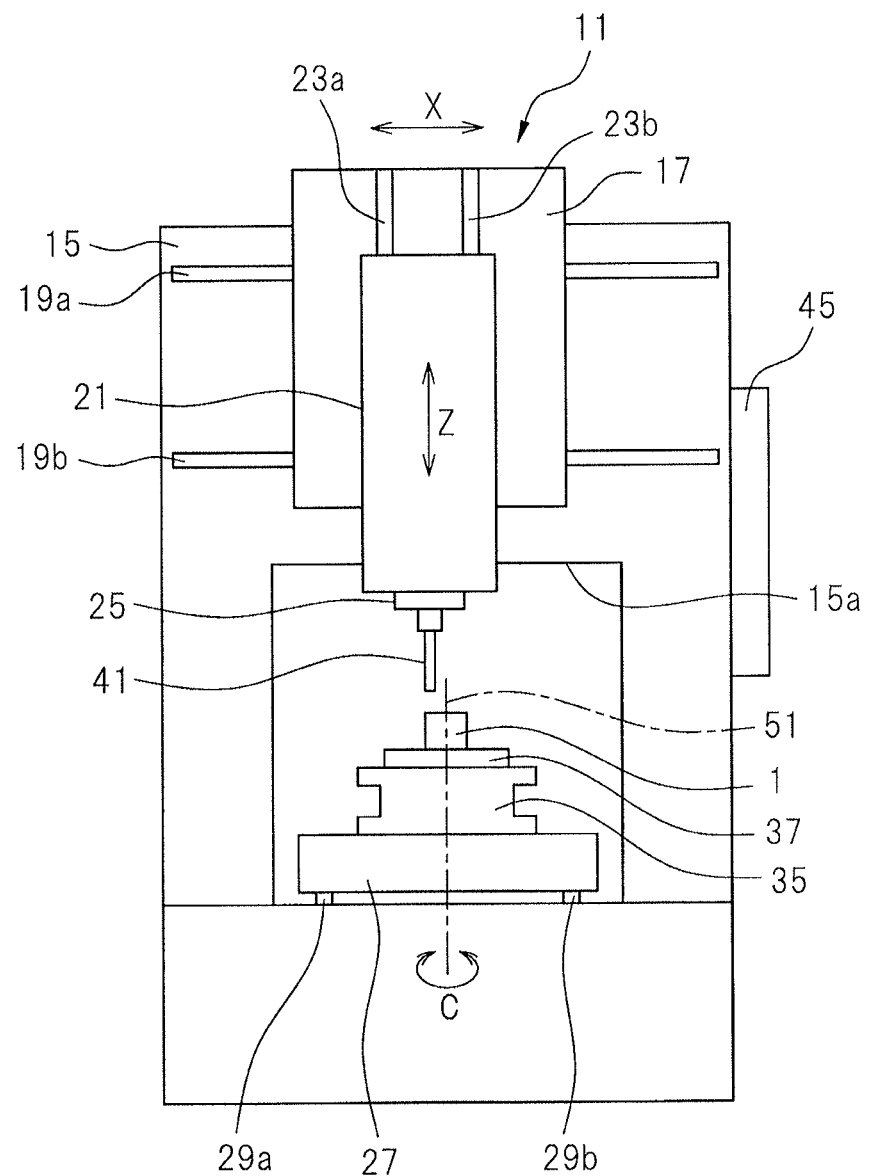
FIG. 2 is a schematic front view of a machine tool in an embodiment.

FIG. 1 is a schematic side view of a machine tool in the present embodiment. FIG. 2 is a schematic front view of a machine tool in the present embodiment. Referring to FIG. 1 and FIG. 2, the machine tool 11 in the present embodiment is provided with a bed 13 serving as a base and a column 15 which is provided on the top surface of the bed 13. At the top surface of the bed 13, a carriage 27 is arranged at the front of the column 15. On the top surface of the carriage 27, a rotary table 35 is arranged as a workpiece rotating device for making the workpiece 1 rotate. On the top surface of the rotary table 35, a holding member 37 is arranged for holding the workpiece 1 at the rotary table 35. The workpiece 1 is fastened through the holding member 37 to the rotary table 35.

At the front surface of the column 15, a saddle 17 is arranged. Further, at the front surface of the saddle 17, a spindle head 21 is arranged. Inside the spindle head 21, a spindle 25 is arranged. The spindle 25 has a rotary tool 41 attached to it for drilling a hole in the workpiece 1. In the present embodiment, as the rotary tool 41, a rod shaped drill is attached. The rotary tool 41 in the present embodiment is rotated about the axis in the vertical direction of the spindle 25.

The machine tool 11 in the present embodiment is provided with a movement device which changes the relative position between the rotary tool 41 and the workpiece 1. In the present embodiment, the axis which extends in the direction of movement of the spindle 25 (in FIG. 1, top-down direction) is called the "Z-axis". Further, the axis which extends in the direction of movement of the carriage 27 (in FIG. 1, left-right direction) is called the "Y-axis". Further, the axis which extends in the direction vertical to the Z-axis and Y-axis (in FIG. 2, left-right direction) is called the "X-axis".

The movement device in the present embodiment can make the rotary tool 41 and the workpiece 1 move relatively in the X-axis direction, Y-axis direction, and Z-axis direction. Furthermore, the movement device in the present embodiment can make the rotary tool 41 and workpiece 1 move relatively about the C-axis 51.

The movement device in the present embodiment includes a Y-axis movement device. The Y-axis movement device includes a pair of Y-axis rails 29a and 29b which are arranged on the top surface of the bed 13. The carriage 27 is formed to be able to move back and forth along the Y-axis rails 29a and 29b. The column 15 is formed with a cavity 15a so that the carriage 27 can move in the Y-axis direction. In the present embodiment, the carriage 27 is able to enter the inside of the cavity 15a. The Y-axis movement device in the present embodiment uses a ball screw mechanism to make the carriage 27 move. The Y-axis movement device includes a ball screw mechanism which is arranged on the bed 13 and an Y-axis feed motor which makes a threaded shaft of the ball screw mechanism rotate. The Y-axis movement device operates the Y-axis feed motor to make the carriage 27 move. The rotary table 35 and the workpiece 1 move together with the carriage 27 in the Y-axis direction.

The movement device in the present embodiment includes an X-axis movement device. The X-axis movement device includes a pair of X-axis rails 19a and 19b which are formed at the front surface of the column 15. The saddle 17 is formed to be able to move back and forth along the X-axis rails 19a and 19b. The X-axis movement device uses a ball screw mechanism to move the saddle 17. The X-axis movement device includes a ball screw mechanism which is arranged at the column 15 and an X-axis feed motor which makes a threaded shaft of the ball screw mechanism rotate. The X-axis movement device operates the X-axis feed motor to make the saddle 17 move. The spindle head 21 and the rotary tool 41 move together with the saddle 17 in the X-axis direction.

Further, the movement device in the present embodiment includes a Z-axis movement device. The Z-axis movement device includes a pair of Z-axis rails 23a and 23b which are formed on the front surface of the saddle 17. The spindle head 21 is formed to be able to move back and forth along the Z-axis rails 23a and 23b. The Z-axis movement device uses a ball screw mechanism to move the spindle head 21. The Z-axis movement device includes a ball screw mechanism which is arranged at the saddle 17 and an Z-axis feed motor which makes a threaded shaft of the ball screw mechanism rotate. The Z-axis movement device operates the Z-axis feed motor to make the spindle head 21 move. The rotary tool 41 moves together with the spindle head 21 in the Z-axis direction. Further, inside of the spindle head 21, a drive motor is arranged for rotating the spindle 25 about axis of rotation.

The movement device in the present embodiment includes a C-axis rotating movement device. The C-axis rotating movement device includes a rotary table 35. Inside the rotary table 35, a drive motor is arranged. The rotary table 35 is formed so as to rotate the workpiece 1 about a C-axis 51 by operation of the drive motor.

The machine tool in the present embodiment includes a control device 45. The control device 45 is connected to the feed motors or drive motors of the movement device. The control device controls the movement device so as to make the rotary tool 41 move relative to the workpiece 1.

Figure 3:
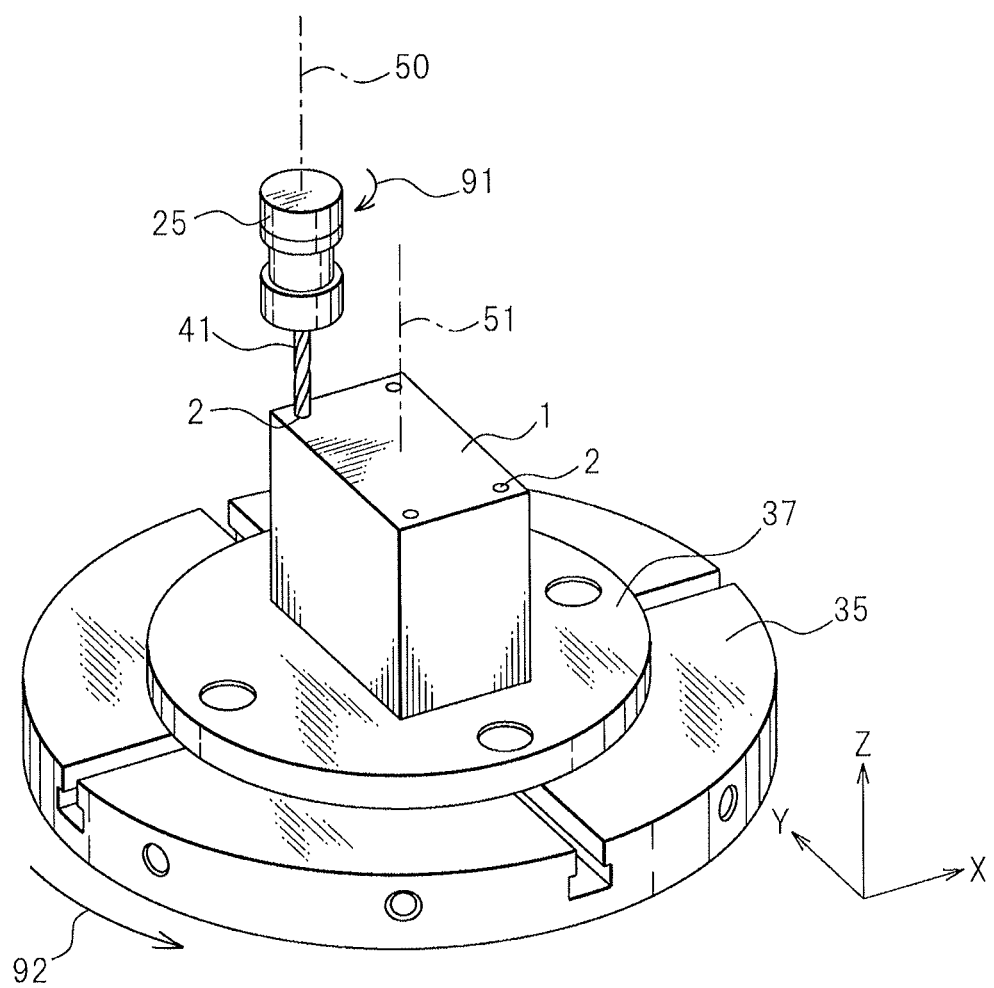
FIG. 3 is an enlarged perspective view of a rotary tool, workpiece, and rotary table part in an embodiment.

FIG. 3 is a schematic perspective view of a workpiece, rotary table, and rotary tool when using a machine tool in the present embodiment to drill a hole in a workpiece. In the present embodiment, the example will be explained of drilling holes 2 in the four corners of one surface of a block shaped workpiece 1.

The rotary table 35 in the present embodiment rotates about the C-axis 51 as an axis of rotation. The axis of rotation 50 of the rotary tool 41 is an axis parallel to the direction along which the rotary tool 41 extends and forms an axis passing through the center of the approximate circle of the cross-sectional shape of the rotary tool 41. The rotary tool 41, as shown by the arrow mark 91, rotates about the axis of rotation 50. The C-axis 51 of the axis of rotation of the workpiece 1 and the axis of rotation 50 of the rotary tool 41 are formed to be parallel with each other.

Figure 4:
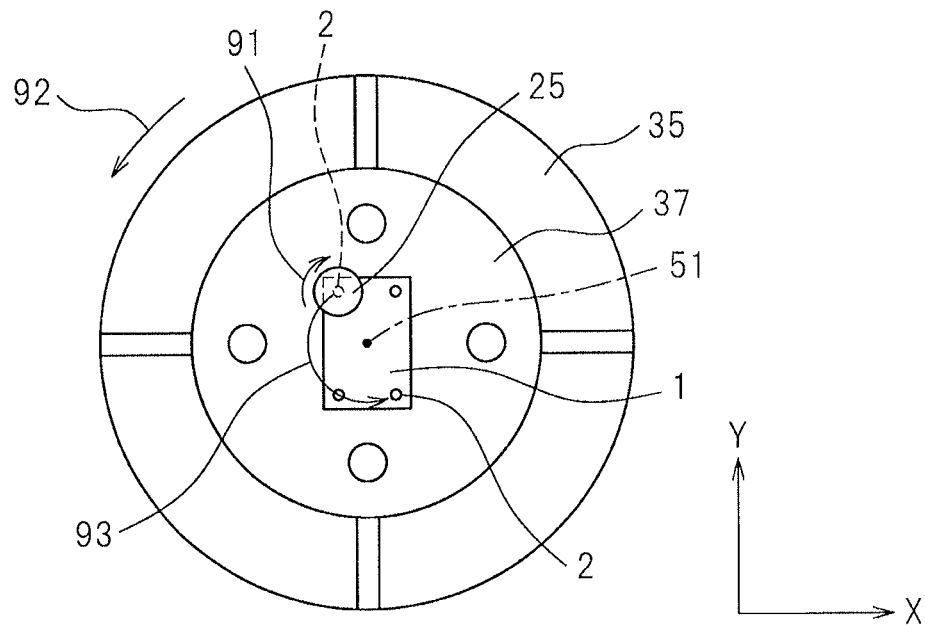
FIG. 4 is a first schematic view when viewing the spindle, workpiece, and rotary table from a plane view in an embodiment.

FIG. 4 is a first schematic view when viewing the workpiece, spindle, and rotary table from a plane view. Referring to FIG. 3 and FIG. 4, the workpiece 1 is fixed in position on the rotary table 35 by a holding member 37 which is arranged on the top surface of the rotary table 35. In the present embodiment, the workpiece 1 is attached to the rotary table 35 so that the position of drilling the hole 2 of the workpiece 1 becomes a different position from the C-axis 51 of the axis of rotation of the workpiece 1. In the present embodiment, the workpiece 1 is arranged so that the center of gravity position of the workpiece 1 is located on the C-axis 51. In the present embodiment, the positions of the plurality of holes 2 become positions symmetric about the C-axis 51.

The control device 45 of the machine tool 11 makes the rotary tool 41 rotate as shown by the arrow mark 91. The control device 45 uses the Z-axis movement device to make the rotary tool 41 move relatively in a direction approaching the workpiece 1. The rotary tool 41 and the workpiece 1 move relatively so as to drill a hole 2.

Further, the control device 45, as shown by the arrow mark 92, makes the rotary table 35 rotate. The rotating direction of the rotary table 35 at this time is set to be the reverse direction from the rotating direction of the rotary tool 41. By rotation of the rotary table 35, the position for drilling a hole 2 in the workpiece 1 also rotates about the C-axis 51. The machine tool 11 of the present embodiment controls the position of the spindle head 21 so that the rotary tool 41 is always arranged at the position for drilling a hole 2 in the workpiece 1 while drilling the hole 2. The machine tool 11 of the present embodiment uses the X-axis movement device and the Y-axis movement device to move the spindle head 21. The control device 45 controls the X-axis movement device and the Y-axis movement device so as to make the position of the rotary tool 41 track the rotational motion of the position for drilling the hole 2 in the workpiece 1.

Figure 5:
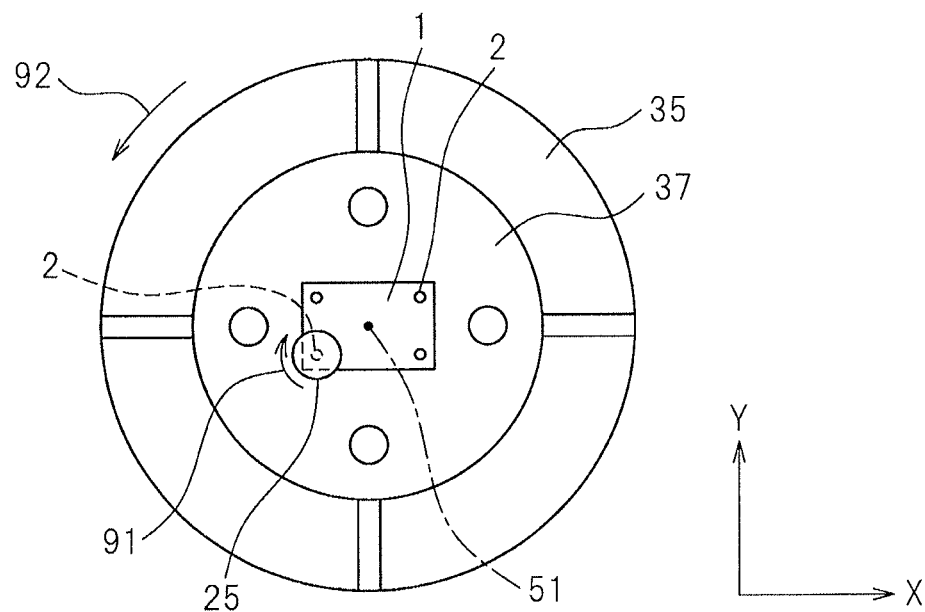
FIG. 5 is a second schematic view when viewing the spindle, workpiece, and rotary table from a plane view in an embodiment.

FIG. 5 is a second schematic view when viewing the workpiece, spindle, and rotary table from a plane view. FIG. 5 is a view when the rotary table 35 rotates by 90° from the state which is shown in FIG. 4. Referring to FIG. 4 and FIG. 5, the workpiece 1 rotates about the C-axis 51, so the position for drilling a hole 2 changes. The position of the hole 2, as shown by the arrow mark 93, rotates about the C-axis 51. By the rotary table 35 rotating by 90°, the position of the hole 2 of the workpiece 1 also rotates by 90°. The spindle 25 is controlled, as shown by the arrow mark 93, so as to orbit 90° about the C-axis 51. In this way, the spindle 25 engages in rotational motion corresponding to the position of the hole 2 which is formed. The rotary tool 41 which is supported by the spindle 25 is constantly arranged right above the hole 2 while drilling a hole 2. That is, synchronized with the rotational motion of the position of the hole 2 of the rotational workpiece 1, control is performed for rotational motion of the position of the rotary tool 41.

Figure 6:
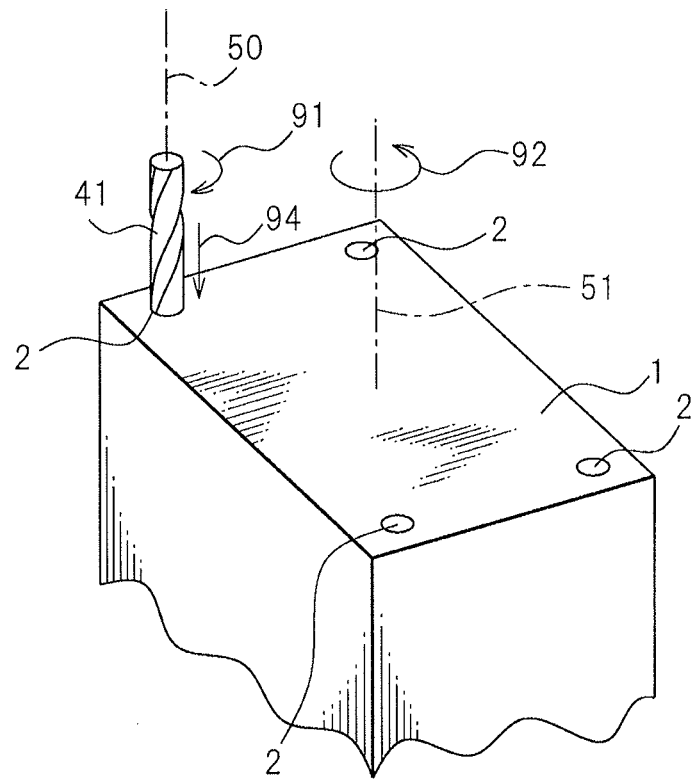
FIG. 6 is an enlarged perspective view of a workpiece and rotary tool when drilling a hole in a workpiece in an embodiment.

FIG. 6 is an enlarged schematic perspective view of a workpiece and rotary tool in the present embodiment. The rotary tool 41, as shown by the arrow mark 91, rotates about the axis of the rotary tool 41. Further, the rotary tool 41 orbits while tracking rotational motion of the hole 2. Further, the rotary tool 41, as shown by the arrow mark 94, moves toward the workpiece 1 to drill the hole 2.

Figure 7:
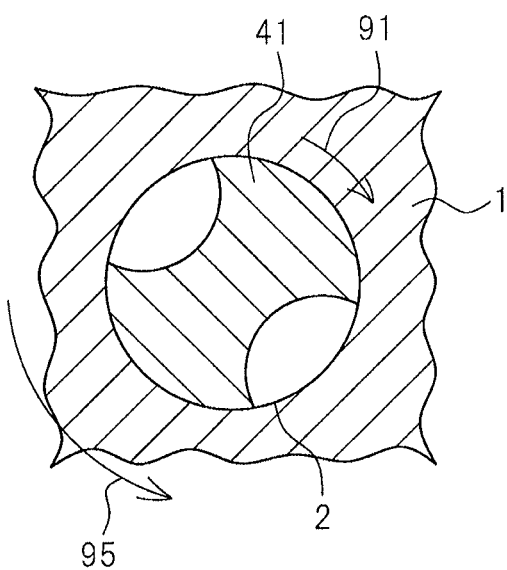
FIG. 7 is an enlarged perspective view of a workpiece and rotary tool when drilling a hole in a workpiece in an embodiment.

FIG. 7 is an enlarged schematic cross-sectional view of the hole of a workpiece which is drilled in the present embodiment and a rotary tool. The rotary tool 41 rotates in the direction shown by the arrow mark 91, while the hole 2 of the workpiece 1, as shown by the arrow mark 95, rotates in the opposite direction of the rotary tool 41. For example, by having the workpiece 1 rotate once around the C-axis 51, the hole 2 also orbits once in the direction which is shown by the arrow mark 95.

In this way, in the machine tool of the present embodiment, it is possible to make the workpiece 1 rotate in the opposite direction to the rotating direction of the rotary tool 41, so it is possible to form a hole with an excellent machining accuracy. For example, it is possible to keep the shape of the hole from changing or the straightness accuracy of the hole from deteriorating in the depth direction of the hole. In particular, when the hole is a deep hole, it is possible to form a hole with excellent machining accuracy.

Figure 8:
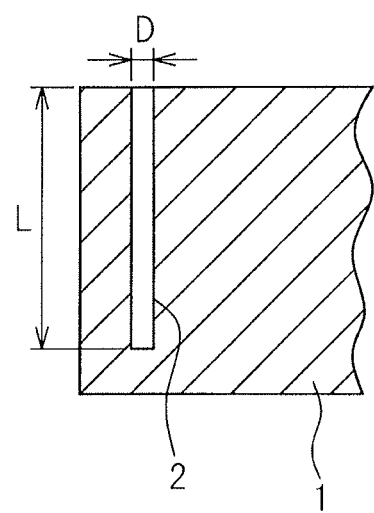
FIG. 8 is an enlarged perspective view of a hole which is drilled in a workpiece.

FIG. 8 is a schematic cross-sectional view of a hole which is drilled in a workpiece. As a deep hole with a small diameter D of the hole 2 and a large depth L, for example, a hole with a ratio (L/D) of the depth L of the hole 2 to the diameter D of the hole 2 is 7 or more may be illustrated. In such a deep hole, the diameter of the rotary tool 41 is narrow and the length becomes long, so the rotary tool 41 becomes low in rigidity and the machining accuracy sometimes deteriorates. However, in the case of forming such a deep hole as well, in the present embodiment, it is possible to make the workpiece rotate in the opposite direction to the rotating direction of the rotary tool, so it is possible to drill a hole excellent in machining accuracy. Alternatively, for a rotary tool which forms a deep hole, when the ratio of the length in the axial direction to the diameter of the rotary tool 41 is 7 or more, the effect of the present invention becomes remarkable. Here, the length of the rotary tool 41 in the axial direction can illustrate the length in the axial direction of the rotary tool 41 which sticks out from the tool holder.

In this way, the hole drilling method in the present embodiment includes a rotating step of attaching a workpiece to a workpiece rotating device to make the workpiece rotate and a hole drilling step of making the rotary tool and the workpiece move relative to each other in directions in which they approach each other so as to drill a hole. The rotating step includes a step of attaching a workpiece to a workpiece rotating device so that the position of drilling the hole in the workpiece becomes a different position from the axis of rotation of the workpiece and making the workpiece rotate in a direction opposite to the rotating direction of the rotary tool. The hole drilling step drills a hole while making the position of the rotary tool track rotation of the workpiece so that the rotary tool is arranged at the position for drilling a hole in the workpiece. This hole drilling method is not limited to the machine tool in the present embodiment. It can be performed by any machine tool which can perform the above rotating step and the above hole drilling step.

Further, in the machine tool and hole drilling method of the present embodiment, a hole 2 can be drilled at a position away from the C-axis 51 of the axis of rotation of the rotary table 35. There is no need to set the position for drilling the hole 2 on the C-axis 51 of the rotary table 35. When drilling a plurality of holes 2 in a workpiece 1, there is no need to refasten the workpiece 1 to the rotary table 35 each time drilling one hole 2. By controlling the movement device, it is possible to continuously drill a plurality of holes. As a result, it is possible to drill a plurality of holes 2 in a short time. In the present embodiment, it is possible to consecutively drill four holes in the surface of one workpiece 1.

Further, in the present embodiment, it is possible to arrange the holes 2 at any positions at the rotary table 35, so the degree of freedom when fastening the workpiece 1 to the rotary table 35 increases. For this reason, for example, it is possible to fasten the workpiece 1 so that the center of gravity position of the workpiece 1 is arranged on the C-axis 51. As a result, it is possible to avoid the unbalance which occurs when making the workpiece 1 rotate. Further, when the rotary table 35 rotates, it is possible to avoid part of the workpiece 1 from striking a, predetermined part of the machine tool. As a result, it is possible to increase the size of the workpiece 1 which can be machined.

Further, according to the present invention, there is no need to align the position of the hole 2 with the C-axis 51, so it is possible to fasten the workpiece 7 freely on the rotary table 35 so that the efficiency of machining is improved.

In the machine tool of the present embodiment, two linear feed axes are used to make the rotary tool 41 track the position of the hole 2 of the workpiece 1, but the invention is not limited to this. It is also possible to use three or more linear feed shafts. Alternatively, since the rotary tool 41 is made to track the position of the hole 2 of the workpiece 1, it is also possible to use the axis of rotation. For example, it is also possible to arrange a rotating movement device which makes the spindle 25 rotate about the C-axis 51.

In this regard, the control device 45 of the machine tool 11 of the present embodiment preferably controls locations in the X-axis direction and the Y-axis direction for making the rotary tool 41 track rotation of the hole 2 due to the rotary table 35 being driven to rotate and controls the Z-axis direction for inserting the rotary tool 41 into the workpiece 1 independently. Due to this configuration, control of the relative speed of the workpiece 1 and rotary tool 41 in the Z-axis direction can be performed without relying on rotational drive of the workpiece 1 and spindle 25 about the C-axis 51.

As a comparative example, when instructing the speed of movement of the spindle and the locations of the X-coordinate, Y-coordinate, and Z-coordinate at a predetermined time, the locations of the X-coordinate, Y-coordinate, and Z-coordinate are interpolated. In this regard, as a result of the interpolation, sometimes the speed of insertion of the rotary tool 41 in the workpiece in the Z-axis direction will deviate from the desired speed. As opposed to this, as in the present embodiment, by performing control for synchronizing the axis of rotation 50 of the spindle 25 and the position of the hole 2 and control for making them move relatively along the machining axis (Z-axis) independently, a hole is drilled under suitable machining conditions. For example, it is possible to suppress the error in the speed of the spindle in the depth direction when drilling a hole.

In the machining program for driving the machine tool 11, the command for making the spindle 25 rotate so that the spindle 25 tracks the hole 21 along with rotation of the rotary table 35 and the command for making the spindle 25 move in the depth direction of the hole 2 preferably can be input independently. As an example of a machining program, it is possible to prepare in advance a code which starts synchronous control of the axis of rotation 50 of the spindle 25 and the hole 2. Further, it is possible to prepare in advance a code which ends synchronous control of the axis of rotation 50 of the spindle 25 and the hole 2. Between the code which starts the synchronous control and the code which ends the synchronous control, it is possible to describe a command for inserting the rotary tool 41 in the workpiece 1. By preparing such control codes, it is possible to easily prepare a machining program.

The hole drilling method in the present embodiment is particularly suitable for drilling a deep hole. As a product obtained by drilling a deep hole in a workpiece, for example, the present invention can be applied to the production of a valve body of a predetermined hydraulic valve, a common rail which supplies fuel to a fuel injector of a diesel engine, a body of an injector for injecting fuel, etc. Further, the present invention can be applied to drilling a cooling water passage of a mold. In the present embodiment, it is possible to suppress bending or tilting of the hole when drilling a deep hole in such a product and drill it accurately.

The above embodiments can be suitably combined. In the above figures, the same or corresponding parts are assigned the same reference notations. Note that the above embodiments are illustrations and do not limit the invention. Further, in the embodiments, changes in the modes shown in the claims are included.

The invention claimed is:

1. A hole drilling method for making a rotary tool rotate while making the rotary tool and a workpiece move relative to each other so as to drill a hole, comprising:
   a rotating step of attaching the workpiece to a workpiece rotating device to make the workpiece rotate in an opposite direction to a rotating direction of the rotary tool; and
   a hole drilling step of making the rotary tool and the workpiece move relative to each other in a direction in which the rotary tool and the workpiece approach each other so as to drill a hole; wherein
   the hole drilling step comprises making a position of the rotary tool track rotation of the workpiece while drilling the hole so that the rotary tool is arranged at a position for drilling the hole in the workpiece.

2. The hole drilling method as set forth in claim 1, wherein the hole drilling step comprises using two or more linear feed axes to change a relative position of the rotary tool with respect to the workpiece.

3. The hole drilling method as set forth in claim 1, wherein the hole drilling step comprises drilling a deep hole with a ratio of depth to diameter of the hole of 7 or more.

4. A machine tool for rotating a rotary tool while making the rotary tool and a workpiece move relative to each other so as to drill a hole, comprising:
   a workpiece rotating device which makes the workpiece rotate about an axis of rotation parallel to an axis by which a rotary tool rotates;
   a movement device which changes a relative position of the rotary tool and the workpiece; and
   a control device which controls the movement device; wherein
   the control device controls a rotating direction of the rotary tool and a rotating direction of the workpiece to become opposite and controls the movement device so as to drill the hole while making a position of the rotary tool track rotation of the workpiece so that the rotary tool is arranged at a position for drilling the hole in the workpiece.

5. The machine tool as set forth in claim 4, wherein the movement device uses two or more linear feed axes to change the relative position of the rotary tool with respect to the workpiece.

6. The machine tool as set forth in claim 4, further comprising a spindle supporting the rotary tool, wherein the rotary tool includes a drill which is formed in a rod shape, and the drill is made one with a ratio of a length to a diameter of a part sticking out from the spindle of 7 or more.

* * * * *